(12) United States Patent
Robert et al.

(10) Patent No.: US 10,201,952 B2
(45) Date of Patent: Feb. 12, 2019

(54) MULTILAYER FILM FOR FLEXIBLE WRAPPING

(71) Applicant: BOSTIK SA, La Paine Saint Denis (FR)

(72) Inventors: Christophe Robert, Thourotte (FR); Jean-Francois Chartrel, Cuts (FR)

(73) Assignee: BOSTIK SA, La Plaine Saint Denis (FR)

( * ) Notice: Subject to any disclaimer, the term of this patent is extended or adjusted under 35 U.S.C. 154(b) by 984 days.

(21) Appl. No.: 13/946,373

(22) Filed: Jul. 19, 2013

(65) Prior Publication Data
US 2014/0024513 A1 Jan. 23, 2014

(30) Foreign Application Priority Data

Jul. 19, 2012 (FR) ..................................... 12 56986

(51) Int. Cl.
| | | |
|---|---|---|
| B29C 47/06 | (2006.01) | |
| B32B 7/12 | (2006.01) | |
| B32B 27/00 | (2006.01) | |
| C09J 109/06 | (2006.01) | |
| C09J 153/02 | (2006.01) | |
| B32B 37/12 | (2006.01) | |
| B32B 37/15 | (2006.01) | |
| B32B 37/00 | (2006.01) | |
| B32B 15/04 | (2006.01) | |
| B32B 15/20 | (2006.01) | |
| B32B 27/06 | (2006.01) | |
| B32B 29/00 | (2006.01) | |
| B29C 47/00 | (2006.01) | |
| B29C 47/02 | (2006.01) | |
| B29C 47/92 | (2006.01) | |
| B29C 47/14 | (2006.01) | |

(52) U.S. Cl.
CPC ............ *B32B 7/12* (2013.01); *B29C 47/0021* (2013.01); *B29C 47/0064* (2013.01); *B29C 47/025* (2013.01); *B29C 47/065* (2013.01); *B29C 47/92* (2013.01); *B32B 15/04* (2013.01); *B32B 15/20* (2013.01); *B32B 27/06* (2013.01); *B32B 29/002* (2013.01); *B32B 37/0038* (2013.01); *B32B 37/1284* (2013.01); *B32B 37/153* (2013.01); *C09J 153/02* (2013.01); *B29C 47/14* (2013.01); *B29C 2947/92514* (2013.01); *B29C 2947/92704* (2013.01); *B32B 2307/31* (2013.01); *B32B 2307/4026* (2013.01); *B32B 2307/412* (2013.01); *B32B 2307/7244* (2013.01); *B32B 2309/02* (2013.01); *B32B 2309/105* (2013.01); *B32B 2309/14* (2013.01); *B32B 2439/00* (2013.01); *B32B 2439/70* (2013.01); *B32B 2553/00* (2013.01); *C08L 2205/02* (2013.01); *Y10T 428/24967* (2015.01); *Y10T 428/265* (2015.01)

(58) Field of Classification Search
CPC ........................... C09J 153/02; C09J 153/025
USPC ......................................... 428/354
See application file for complete search history.

(56) References Cited

U.S. PATENT DOCUMENTS

| | | | | |
|---|---|---|---|---|
| 2004/0007322 A1* | 1/2004 | Lechat | ..................... | C09J 7/387 156/289 |
| 2009/0291298 A1* | 11/2009 | Robert | ..................... | B32B 7/12 428/336 |
| 2011/0162782 A1* | 7/2011 | Goubard | ................... | B32B 7/12 156/98 |

FOREIGN PATENT DOCUMENTS

| | | |
|---|---|---|
| EP | 2 123 444 | 11/2009 |
| WO | WO 2010/012906 | 2/2010 |

OTHER PUBLICATIONS

Wingtack® 10 Safety Data Sheet, Total Petrochemicals & Refining USA. (Year: 2014).*
Search Report of FR 12569865, dated Dec. 10, 2012.

* cited by examiner

*Primary Examiner* — Ramsey Zacharia
(74) *Attorney, Agent, or Firm* — Millen, White, Zalano and Branigan, P.C.

(57) ABSTRACT

A subject of the present invention relates to a multilayer (or laminate) film, that can be used in the field of flexible wrapping, comprising at least 2 thin layers of material bonded together by a layer of an adhesive composition based on a styrene block copolymer. It also relates to a lamination process suitable for the manufacture of said film.

16 Claims, 2 Drawing Sheets

FIG. 1

PRIOR ART

FIG. 2

PRIOR ART

MULTILAYER FILM FOR FLEXIBLE WRAPPING

CROSS-REFERENCE TO RELATED APPLICATIONS

This application claims benefit of FR 12 56 986, filed Jul. 19, 2012, the disclosure of which is hereby incorporated by reference.

TECHNICAL FIELD

The present invention relates to a multilayer (or laminate) film that can be used in particular in the field of flexible wrapping, which comprises at least 2 thin layers of materials bonded together by a layer of an adhesive composition based on a styrene block copolymer. It also relates to a lamination method suitable for producing said film.

STATE OF THE ART

The flexible wrappings intended for the packaging of a wide range of products, such as those manufactured by the agri-food, cosmetics or detergent industries, are generally constituted by several thin layers or substrates (in the form of foils or films) the thickness of which is comprised between 5 and 150 µm and which are constituted by different materials such as paper, aluminium or the thermoplastic polymers such as polyethylene (or PE), polypropylene (or PP), oriented or not, copolymers of ethylene and of vinyl acetate (or EVA), or also the bio-sourced polymers such as the polymers originating from lactic acid (PLA). The corresponding multilayer film, the thickness of which can vary from 20 to 400 µm, makes it possible to combine the properties of the different individual layers of material and thus provide the consumer with a set of characteristics suitable for the final flexible wrapping such as for example: its visual appearance (in particular that of the printed elements showing the information relating to the wrapped product and intended for the consumer), a barrier effect against atmospheric humidity or oxygen, contact with food with no risk of toxicity or alteration of the organoleptic properties of the wrapped food, chemical resistance for certain products such as ketchup or liquid soap, good behaviour at a high temperature (for example in the case of sterilization) or on the other hand at a very low temperature (deep freezing). To constitute the final wrapping, the multilayer film is generally shaped by heat sealing, at a temperature varying from approximately 120 to 250° C., the latter technique also being used for closing the wrapping around the product intended for the consumer.

The various layers of material constituting the multilayer film are combined or assembled by laminating during the course of a lamination operation using adhesives and appliances or machines designed for the purpose. The multilayer film thus obtained is itself often referred to by the terms "laminate" or "composite".

The multilayer films that can be used for the manufacture of flexible wrappings generally bear, on at least a portion of their surface area, printed elements showing information relating to the wrapped product. These printed elements result from the depositing of various inks, via a printing process, onto one of the thin layers, which is constituted by a transparent material, prior to the laminating operation. This operation is then carried out so that in the final multilayer film, said deposit is in contact with the adhesive, the printed elements thus being protected from the outer environment by the thin transparent layer.

The lamination adhesives can sometimes be presented in industrial practice in the form of water-based adhesives (for example of the casein or acrylic type) but are very generally adhesive compositions of the polyurethane type.

These adhesives are used in industrial settings specialized in lamination (often called laminators) in machines which operate continuously with line speeds which are generally high and in which both the films constituting the individual layers and the final laminate film are, as a result of their very large dimensions, packaged by rolling in the form of large reels the width (standard width) of which can range up to approximately 2 m and the diameter up to 1.80 m. The final reel of laminate, on which the elements of information of the future wrapping are generally printed, is often called parent reel.

The laminating methods generally implemented industrially with adhesives of the polyurethane type comprise firstly a step of coating adhesive onto a first film of material, which consists of the deposition over its entire surface area of a continuous layer of adhesive having a controlled thickness, corresponding to a quantity of adhesive (or grammage) that is also controlled. This coating step is followed by a step of laminating a second film of material, identical or different from the first, consisting in the application under pressure of the second film onto the first film covered with the layer of adhesive.

In the coating step, the continuous layer of adhesive is deposited, at a temperature varying according to the case from ambient temperature up to around one hundred degrees, at the end of a transfer which results from the film of material to be coated being placed in contact under pressure of a rotating roll, previously loaded with adhesive, with the film of material to be coated. In the laminating step, the pressure necessary for the application of the second film onto the film coated with adhesive is generally exerted by passing the corresponding films between 2 rolls. The coating and laminating steps are implemented continuously on the same laminating installation.

The laminate thus obtained generally comprises a quantity of adhesive of the polyurethane type less than 10 $g/m^2$ (corresponding to a continuous layer having a thickness not greater than approximately 10 µm) and generally less than 5 $g/m^2$. The laminate films manufactured according to this type of method are very suitable for the manufacture of flexible wrapping due to their excellent cohesion. This cohesion is also maintained during shaping of the film for making up the flexible wrapping, in particular after heat sealing. Furthermore, the very small thickness of this layer of adhesive advantageously makes it possible to maintain the flexible and often transparent character of the films of materials necessary for making up flexible wrappings.

The actual laminating operation is very often followed by an operation of cutting out the composite film which is also done by the laminator, so as to generate, from one parent reel, several daughter reels of a smaller width, comprised for example between 10 cm and 1 m.

These daughter reels are intended to be transported and delivered to the various industrial clients of the laminators, who use them directly on their packaging lines for wrapping their own products, for example agri-food, cosmetics or detergents, and intended, in particular, for the consumer.

Continuous industrial laminating methods using polyurethane type adhesives advantageously allow high productivity, reaching composite film production line speeds of 450 m/minute or even more.

The laminating adhesives of the polyurethane type found in practice are historically solvent-based and presented in the form of so-called "two-component" or "one-component" systems.

The "two-component" systems are supplied to the laminator in the form of 2 organic solutions containing chemical entities which are generally, at least for one of the 2 solutions, polyurethane or polyester polymers (having a molecular weight of approximately 1000 to 30000 Da), the other solution capable of containing single molecules. These chemical entities bear for one of the solutions, isocyanate terminal groups, and, for the other solution, hydroxyl terminal groups. The mixture of the 2 solutions is made by the laminators prior to starting the laminating machine. During the operation of the machine, after coating of the mixture thus obtained and before laminating, the solvent is evaporated. On completion of these evaporation and lamination steps, the isocyanate groups of one of the entities react with the hydroxyl groups of the other entity, according to a so-called cross-linking reaction, in order to form a three-dimensional matrix with urethane bonds which provide the cohesion of the junction between the 2 thin laminated layers. The time required to complete this cross-linking reaction is however very significant, of the order of 3 to 7 days in order to provide the required cohesion.

The "one-component" systems are supplied to the laminator in the form of a single organic solution containing a polyurethane polymer having isocyanate terminal groups with a molecular weight of approximately 10 to 30 kDa. The cohesion of the adhesive layer (or junction) between the 2 thin laminated layers of material is achieved after completion of a three-dimensional matrix with a urethane and/or urea bond resulting from a cross-linking reaction between the isocyanate terminal groups and water which is present in the form of atmospheric humidity or also dampness in the material of the layers for assembly. Also in this case, the time required to complete this cross-linking reaction is however very significant and of the order of 3 to 7 days in order to provide the required cohesion.

An improvement of this lamination method results from the omission of the solvent evaporation step, which is made possible by the use of polyurethane type adhesives without solvent.

These adhesives are polyurethanes having a molecular mass comprised between approximately 1 and 20 kDa.

This type of adhesive, like the previous one, can be presented in the form of "two-component" or "one-component" systems. In both cases, after deposit of the adhesive on the thin layer of material to be coated and lamination with the second thin layer of material, the cohesion of the junction between the 2 layers also requires the completion of a three-dimensional matrix (with urethane and urea bonds) which results from a cross-linking reaction between isocyanate and hydroxyl terminal groups. Also for this type of adhesive, the time required for completing this cross-linking reaction is very long, possibly up to 2 weeks in the case of adhesives of the polyurethane bi-component type without solvent.

The length of the cross-linking time associated with adhesives of the polyurethane type entails drawbacks with respect to the organization of the laminators' industrial production. It is thus necessary to have storage areas available for storing the parent reels of composite film either at ambient temperature, or at a temperature above ambient temperature, for a duration from several days to 2 weeks, necessary for the completion of cross-linking. In addition to this drawback is that of the need to wait for at least partial completion of the cross-linking reaction in order to retrieve the parent reels and convert them by cutting into daughter reels.

Another drawback of the adhesives of the polyurethane type relates to the use of composite films laminated by their intermediary in order to produce flexible wrappings intended for food products. This type of adhesives can in fact contain certain quantities of small aromatic molecules with a diisocyanate group, which originate from monomers unreacted during the manufacture of the polyurethanes. These small molecules are capable of migrating through the layers of the flexible wrapping and come into contact with the food products to react with the dampness contained in the latter and form primary aromatic amines that are well known for their toxicological health risks. In order to overcome this risk, the quantity of these amines is kept below a certain upper limit of harmlessness, specified by some legislations, which is assessed by tests carried out under standard conditions. These tests are implemented both during the development of the adhesive in the laboratory and in one-off tests, on samples of the product manufactured industrially. The presence of primary aromatic amines can be avoided entirely by using polyurethanes obtained from aliphatic diisocyanate monomers, but in this case the cross-linking of the adhesive requires a particularly long time, up to 7 or 10 days, and must be carried out at a temperature above ambient temperature.

Adhesives other than those of polyurethane type and methods of using them have been proposed, for the purpose of manufacturing laminated (or multi-layer) films.

Application WO 02/064694 thus describes a three-layer thermoplastic film comprising a layer of 20 μm thickness constituted by an adhesive composition which comprises a polystyrene and polyisoprene block copolymer, as well as a tackifying resin. This three-layer film is obligatorily manufactured by co-extrusion blowing, the adhesive layer allowing the manufacture of wrappings with easy opening and reclosing of "repositionable" type. Such laminated film is however unsuitable, owing to its method of manufacture, for the presence of printed elements showing information relating to the wrapped product. It does not in fact make it possible to obtain, on the face of a thin transparent layer, a deposit of inks that are in contact with the adhesive layer.

The international application WO 96/25902 describes moreover a coating method relating to the deposit on a first substrate of a substantially continuous layer of a thermoplastic composition in the molten state, in particular of a thermofusible adhesive, which allows the application of very low grammages of this composition, for example less than 10 g/m². This coating method is in particular implemented for laminating a second substrate onto the first substrate thus coated.

The thermofusibles adhesives (often referred to as "Hot Melt adhesives" or "HM") are solid substances at ambient temperature which contain neither water nor solvent. Applied in the molten state, they solidify on cooling, thus very rapidly forming a joint which ensures cohesion of the substrates (or films) to be bonded in the laminate.

According to the coating process described by the application WO 96/25902 (often referred to as "curtain coating") the thermoplastic composition, rendered pourable at an appropriate temperature, is produced in the form of a continuous film by a coating device, for example a nozzle with a lip (or slot), which is not in contact with the substrate to be coated. The continuous film (in the form of a curtain) thus produced therefore passes through the air for a certain distance, ranging from 0.5 millimetre to approximately 20 millimetres, before being deposited on the substrate to be coated.

In an embodiment, application WO 99/28048 describes an improvement of the method of the previous application consisting of applying pressure onto the layer of thermoplastic composition coating the substrate, carried out by means of a roll having an non-stick covering.

Notwithstanding, the adhesives actually taught by these 2 latter applications are implemented with a substrate coating productivity not exceeding 70 m/minute.

Patent application EP 2 123 444 describes a multilayer film the adhesive composition of which comprises a mixture of styrene block copolymers and a tackifying resin. Although it has very good adhesion, the multilayer film described in this patent application is not suitable for all flexible wrapping applications. In fact, in the case of films having non-printed areas, intended for viewing the food item or wrapped object, the transparency and uniformity of appearance of the multilayer structure is inadequate. The same problem of lack of uniformity of the adhesive layer is also apparent when one of the layers is transparent and the second is a metallized film.

Application WO 2010/012906 describes an adhesive composition intended for sticking permanent self-adhesive labels. The quantity of adhesive on the surface of the support ranges from 10 to 70 g/m$^2$, corresponding to an adhesive layer thickness of 10 to 70 μm. The self-adhesive label comprises a support and the layer of adhesive composition, which is generally covered with a silicone-coated support ("release liner") intended to be removed before application of the label onto the labelled article. Such labels have practically no cohesive strength and cannot be implemented in a heat sealing process.

The purpose of the present invention is to provide a transparent multilayer film for flexible wrapping that at least partially overcomes the abovementioned drawbacks.

SUMMARY OF THE INVENTION

A first subject of the invention relates to a multilayer film comprising at least 2 thin layers of material bonded together by a layer having a thickness strictly less than 10 μm of an adhesive composition comprising:
a) from 30 to 60% of a mixture of styrene block copolymers comprising at least one elastomer block, this mixture consisting of:
   5 to 75% of at least one triblock copolymer chosen from the group comprising SIS, SIBS, SBS, SEBS and SEPS, and from
   25 to 95% of at least one diblock copolymer chosen from the group comprising SI, SBI, SIB, SB, SEB, SEP,
the overall content of styrene units of said mixture being comprised between 10 and 40%;
b) from 10 to 60% of one or more tackifying resins S having a softening temperature greater than or equal to 80° C.; and
c) from 5 to 35% of one or more tackifying resins L having a softening temperature less than or equal to 50° C.,
by weight with respect to the total weight of the adhesive composition.

According to an embodiment, the triblock and diblock copolymers present in the mixture of styrene block copolymers have the same elastomer block.

According to an embodiment, the triblock copolymers comprised in the adhesive composition have a linear structure.

According to an embodiment, as mixture of styrene block copolymers, at least one triblock copolymer SIS having a linear structure is used, in a mixture with at least one diblock copolymer SI.

According to an embodiment, the tackifying resin(s) S has (have) a softening temperature greater than or equal to 90° C., preferably ranging from 95° C. to 150° C., more preferably from 100° C. to 130° C.

According to an embodiment, the tackifying resin(s) L having a softening temperature less than or equal to 30° C., preferably ranging from −10° C. to 30° C., more preferably from −5° C. to 20° C.

According to an embodiment, the tackifying resin S having a softening temperature greater than or equal to 80° C. is chosen from:
i) rosins of natural origin or modified, such as for example the rosin extracted from pine gum, wood rosin extracted from tree roots and their derivatives, hydrogenated, partially hydrogenated, dimerized, polymerized or esterified by monoalcohols or polyols such as glycerol;
ii) resins obtained by hydrogenation, polymerization or copolymerization (with or without an aromatic hydrocarbon) of mixtures of unsaturated aliphatic hydrocarbons having approximately 5, 9 or 10 carbon atoms, originating from petroleum cuts;
iii) terpene resins resulting generally from the polymerization of terpene hydrocarbons such as for example monoterpene (or pinene) in the presence of Friedel-Crafts catalysts, optionally modified by the action of phenols;
iv) copolymers based on natural terpenes, for example styrene/terpene, alpha-methyl styrene/terpene and vinyl toluene/terpene.

According to an embodiment, the tackifying resin S having a softening temperature greater than or equal to 80° C. belongs to categories ii) and iii).

According to an embodiment, the tackifying resin L having a softening temperature less than or equal to 50° C. is chosen from:
i) rosins of natural origin or modified, such as for example the rosin extracted from pine gum, wood rosin extracted from tree roots and their derivatives, hydrogenated, dehydrogenated, dimerized, polymerized or esterified by monoalcohols or polyols such as glycerol;
ii) resins obtained by hydrogenation, polymerization or copolymerization (with an aromatic hydrocarbon) of mixtures of unsaturated aliphatic hydrocarbons having approximately 5, 9 or 10 carbon atoms, and originating from petroleum cuts;
iii) terpene resins resulting generally from the polymerization of terpene hydrocarbons such as for example monoterpene (or pinene) in the presence of Friedel-Crafts catalysts, optionally modified by the action of phenols.

According to an embodiment, the adhesive composition comprises:
a) from 35 to 55% of the mixture of styrene block copolymers,
b) from 20 to 55% of tackifying resin(s) S and
c) from 10 to 35% of tackifying resin(s) L
by weight with respect to the total weight of the adhesive composition.

According to an embodiment, the thickness of the layer of adhesive composition is less than or equal to 9 μm, preferably less than or equal to 8 μm, preferably less than or equal to 7 μm, preferably less than or equal to 6 μm and more particularly the thickness ranges from 0.5 to 5 μm.

According to an embodiment, the quantity of adhesive composition is strictly less than 10 g/m$^2$, preferably less than or equal to 9 g/m², preferably less than or equal to 8 g/m², preferably less than or equal to 7 g/m², preferably less than or equal to 6 g/m² and more particularly the quantity ranges from 0.5 to 5 g/m².

According to an embodiment, the thin layers of material have a thickness varying from 5 to 150 μm.

According to an embodiment, the multilayer film according to the invention has a cohesive force greater than or equal to 1 N/15 mm.

According to an embodiment, the thin layers bonded together by the adhesive composition are made from materials chosen from paper, aluminium or thermoplastic polymers.

According to an embodiment, one of the 2 thin layers is constituted by a transparent material and bears a deposit of inks on at least one portion of the face which is in contact with the layer of adhesive composition.

Another subject of the invention relates to the use of the film according to the invention for the manufacture of flexible wrappings.

Another subject of the invention relates to a continuous preparation process of the multilayer film according to the invention, comprising:
i) a coating step by the adhesive composition of a first thin layer of material, in which said composition, rendered pourable by heating to an appropriate temperature, is extruded by a coating device without contact with said thin layer, in the form of a substantially continuous layer, which is then placed in contact with the surface of said thin layer, then
ii) a laminating step of a second thin layer, onto the first thin layer coated according to step i).

Figure 1:
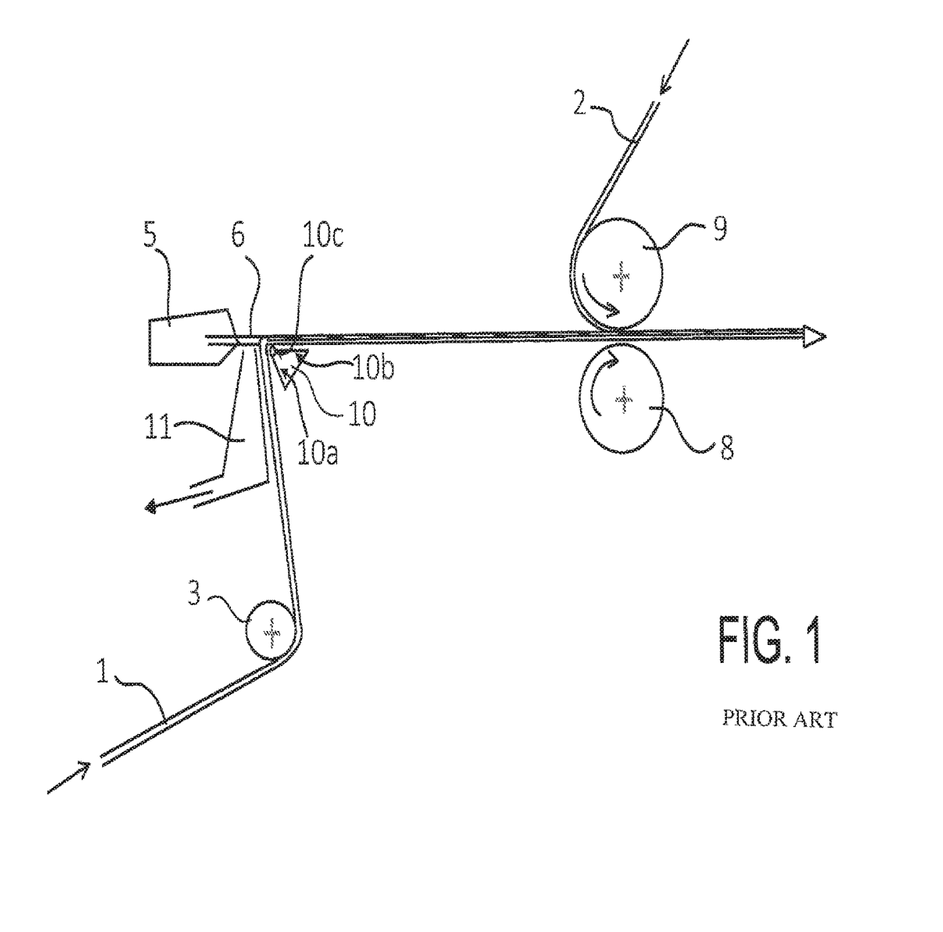
FIG. 1 diagrammatically represents an embodiment of the laminating process according to the invention.

According to an embodiment, in the coating step i), the substantially continuous layer (6) of adhesive composition extruded by the coating device (5):
a) passes through the space between said device and the film (1), suspended in air, the pressure of which is reduced locally to a value comprised between 500 and 975 mbars, preferably between 750 and 900 mbars, then
b) is placed in contact with the film (1) in the vicinity of the edge (10c) formed by the 2 guide surfaces (10a) and (10b) of a deflection element (10) through which a compressed air line passes, opening out via at least one outlet opening in the area of the edge (10c), such that the compressed air discharged forms an air cushion around said edge.

Figure 2:
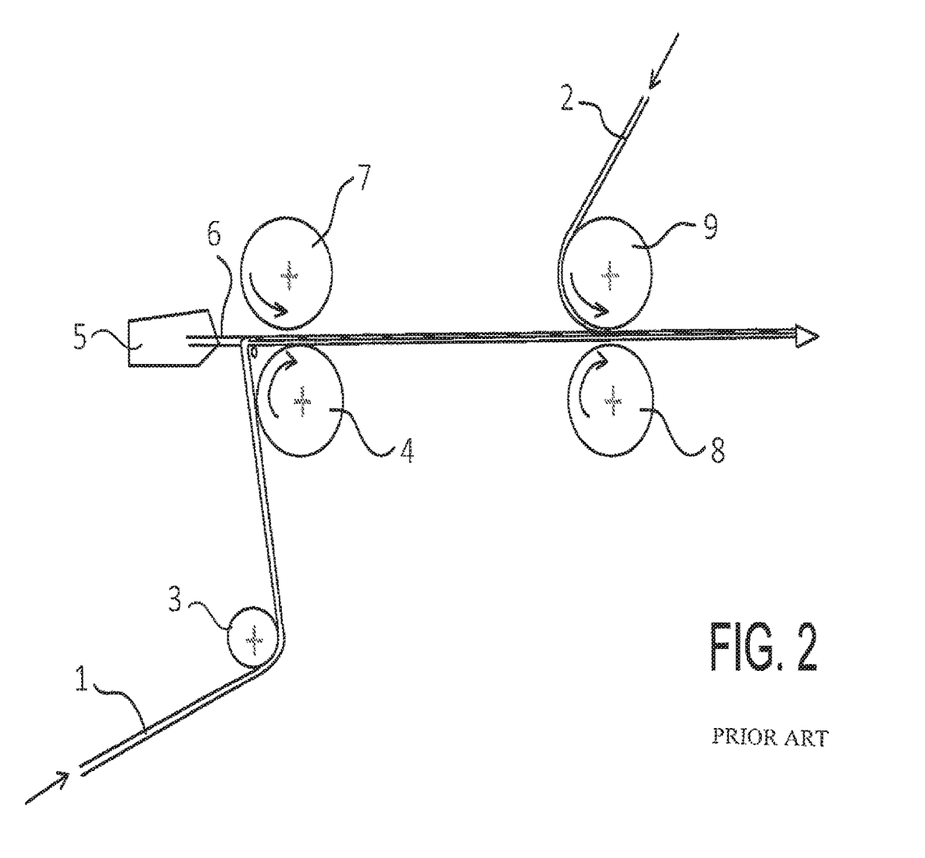
FIG. 2 diagrammatically represents another embodiment of the laminating process according to the invention.

According to an embodiment, in coating step i), the substantially continuous layer (6) of adhesive composition extruded by the coating device (5), after it has been placed in contact with the film (1), is pressed onto the latter by a roll (7) the outer surface of which is provided with a non-stick coating.

An advantage of the present invention is to provide a laminate film comprising a substantially continuous layer having a thickness strictly less than 10 μm of an adhesive of a type other than polyurethane.

Another advantage of the present invention is to provide a composite film comprising a laminating adhesive which does not involve reactive polyurethane and consequently is free from the corresponding toxicological constraints.

Another advantage of the present invention is to provide a composite film comprising an adhesive composition without solvent, thus avoiding the problems, in particular environmental, associated with the use of solvents.

Another advantage of the present invention is to provide a composite film comprising a laminating adhesive which allows the creation of a junction between at least 2 layers of said film without a cross-linking reaction.

Another advantage of the present invention is to propose a laminate film comprising a laminating adhesive which allows, during the manufacture of said film, the operation of cutting a parent reel into daughter reels immediately after the laminating step.

Another advantage of the present invention is to provide a multilayer film having sufficient cohesion to prevent the delamination of the films.

Another advantage of the present invention is to provide a transparent multilayer film.

Another advantage of the present invention is to provide a multilayer film suitable for contact with foodstuffs.

Another advantage of the present invention is to provide a heat-sealable multilayer film that is capable in particular of use in the field of flexible wrappings.

Another advantage of the present invention is to provide a multilayer film comprising an adhesive composition providing at the same time excellent cohesion and a "transparent" and uniform visual appearance.

Other features and advantages of the invention will become apparent on reading the following description of a preferred embodiment of the invention, given by way of example and with reference to the attached drawing:

DETAILED DESCRIPTION OF THE INVENTION

A subject of the present invention relates to a multilayer (or laminate) film comprising at least 2 thin layers of material bonded together by a layer having a thickness strictly less than 10 μm of an adhesive composition comprising:
a) from 30 to 60% of a mixture of styrene block copolymers comprising at least one elastomer block, this mixture consisting of:
5 to 75% of at least one triblock copolymer chosen from the group comprising SIS, SIBS, SBS, SEBS and SEPS, and from
25 to 95% of at least one diblock copolymer chosen from the group comprising SI, SBI, SIB, SB, SEB, SEP,
the overall content of styrene units of said mixture being comprised between 10 and 40%;
b) from 10 to 60% of one or more tackifying resins S having a softening temperature greater than or equal to 80° C.; and
c) from 5 to 35% of one or more tackifying resins L having a softening temperature less than or equal to 50° C.,
by weight/total weight of the adhesive composition.

According to an embodiment, the adhesive composition consists essentially of:
a) from 30 to 60% of a mixture of styrene block copolymers comprising at least one elastomer block, this mixture consisting of:
5 to 75% of at least one triblock copolymer chosen from the group comprising SIS, SIBS, SBS, SEBS and SEPS, and from 25 to 95% of at least one diblock copolymer chosen from the group comprising SI, SBI, SIB, SB, SEB, SEP, the overall content of styrene units of said mixture being comprised between 10 and 40%;

b) from 10 to 60% of one or more tackifying resins S having a softening temperature greater than or equal to 80° C.; and c) from 5 to 35% of one or more tackifying resins L having a softening temperature less than or equal to 50° C., by weight/total weight of the adhesive composition.

Unless stated otherwise, the percentages used in the present text to express quantities correspond to weight/weight percentages.

The softening temperature (or point) is determined according to standard test ASTM E 28, the principle of which is as follows. A brass ring having a diameter of approximately 2 cm is filled with the resin to be tested in the molten state. After cooling to ambient temperature, the ring and the solid resin are placed horizontally in a temperature-controlled glycerine bath, the temperature of which can vary by 5° C. per minute. A steel ball having a diameter of approximately 9.5 mm is centred on the disk of solid resin. The softening temperature, during the phase of temperature increase of the bath at the rate of 5° C. per minute, is the temperature at which the resin disk is forced downward a distance of 25.4 mm under the weight of the ball.

The styrene block copolymers are constituted by different polymerized monomers, including at least one polystyrene block, and are prepared by the free radical polymerization technique. The triblock copolymers include 2 polystyrene blocks and an elastomer block. They can embody various structures: linear, star (also called radial), branched or also comb. The diblock copolymers include 1 polystyrene block and 1 elastomer block.

The styrene block copolymers capable of use in the adhesive composition comprised in the laminate film according to the invention have a weight-average molecular weight Mw generally comprised between 50 kDa and 500 kDa and are constituted by blocks of different polymerized monomers.

The triblock copolymers have the following general formula:

ABA  (I)

in which:

A represents a styrene (or polystyrene) non-elastomer block, and

B represents an elastomer block which can be:

polyisoprene. The structure of the block copolymer is then: polystyrene-polyisoprene-polystyrene, known as: SIS;

polyisoprene followed by a polybutadiene block. The structure of the block copolymer is then: polystyrene-polyisoprene-polybutadiene-polystyrene, known as: SIBS polybutadiene. The structure of the block copolymer is then: polystyrene-polybutadiene-polystyrene, known as: SBS;

totally or partially hydrogenated polybutadiene. The structure of the block copolymer is then: polystyrene-poly(ethylenebutylene)-polystyrene known as: SEBS;

totally or partially hydrogenated polyisoprene. The structure of the block copolymer is then: polystyrene-poly(ethylenepropylene)-polystyrene known as: SEPS.

The diblock copolymers have the following general formula:

A-B  (II)

in which A and B are as defined previously.

When the adhesive composition comprises several triblock styrene copolymers, the latter being chosen from the group comprising SIS, SBS, SEPS, SIBS, SEBS, it is understood that said triblocks can belong to a single one or to several of these 5 families of copolymers.

It is preferable to use a mixture of triblock copolymers and diblock copolymers having the same elastomeric block, in particular because such mixtures are commercially available.

According to another preferred variant, the diblock copolymer content in the mixture of styrene block copolymers is comprised between 50 and 95%.

The triblock copolymers comprised in the adhesive composition according to the invention preferably have a linear structure.

According to an embodiment of the invention, as styrene block copolymer, a triblock copolymer SIS having a linear structure is used, in a mixture with at least one diblock copolymer SI.

As examples of commercial products having a linear structure there can be mentioned:

SIS: Kraton® D1113 BT from Kraton (mixture comprising 55% diblock SI of $M_w$ of approximately 100 kDa, 45% linear triblock SIS of $M_w$ of approximately 250 kDa and having an overall content of styrene units of 16%);

SIBS: Kraton® MD 6465 (56% diblock and 16% styrene)

SBS: Kraton® D1118 (78% diblock and 33% styrene);

SEBS: Kraton® G1726 (70% diblock and 30% styrene).

As examples of commercial products having a radial structure there can be mentioned:

SIS: Vector® 4230 from ExxonMobil (30% diblock and 20% styrene).

The tackifying resin(s) S having a softening temperature greater than or equal to 80° C. represent from 10 to 60% of the adhesive composition, preferably from 20 to 55% of the adhesive composition.

According to an embodiment, the tackifying resin S has a softening temperature greater than or equal to 90° C., preferably ranging from 95° C. to 150° C., more preferably from 100 to 130° C.

According to an embodiment, the tackifying resin S is chosen from:

i) rosins of natural origin or modified, such as for example the rosin extracted from pine gum, wood rosin extracted from tree roots and their derivatives, hydrogenated, dehydrogenated, dimerized, polymerized or esterified by monoalcohols or polyols such as glycerol;

ii) resins obtained by hydrogenation, polymerization or copolymerization (with an aromatic hydrocarbon) of mixtures of unsaturated aliphatic hydrocarbons having approximately 5, 9 or 10 carbon atoms, and originating from petroleum cuts;

iii) terpene resins resulting generally from the polymerization of terpene hydrocarbons such as for example mono-terpene (or pinene) in the presence of Friedel-Crafts catalysts, optionally modified by the action of phenols;

iv) copolymers based on natural terpenes, for example styrene/terpene, alpha-methyl styrene/terpene and vinyl toluene/terpene.

Among the tackifying resins S capable of use in the adhesive composition comprised in the laminate film according to the invention, there can be mentioned as examples of commercially available resin:
i) Sylvalite® RE 100S available from Arizona Chemical which is a rosin resin having a softening temperature of approximately 100° C.
ii) Escorez® 5600 (respectively 5615) available from Exxon Chemicals which is a hydrogenated dicyclopentadiene resin modified by an aromatic compound having a softening temperature of approximately 100° C. (respectively 115° C.) and a molecular weight $M_w$ of approximately 800 g/mol; Escorez® 5400 also from Exxon Chemicals which is a resin obtained by polymerization, then hydrogenation of a mixture of unsaturated aliphatic hydrocarbons having approximately 9 or 10 carbon atoms and which have a softening temperature of approximately 100° C. and a $M_w$ of approximately 670 g/mol; Escorez® 1310 LC available from Exxon Chemicals which is a resin obtained by polymerization of a mixture of unsaturated aliphatic hydrocarbons having approximately 5 carbon atoms, and which has a softening temperature of approximately 94° C. and a $M_w$ of approximately 1900 g/mol; Escorez® 2203 LC available from Exxon Chemicals which is an aliphatic hydrocarbon-containing resin modified by an aromatic compound having a softening temperature of approximately 92° C. and a $M_w$ of approximately 2200 g/mol.
iii) Dercolyte® S115 available from DRT ("Dérivés Résiniques et Terpéniques") which is a terpene resin obtained by polymerization of beta-pinene having a softening temperature of approximately 114° C. and a $M_w$ of approximately 2300 g/mol; Dertophene® T available from DRT which is a terpene resin modified by phenols having a softening temperature of approximately 95° C. and a Mw of approximately 700 g/mol; Sylvarez® TR7115 available from Arizona Chemicals which is a terpene resin having a softening temperature of approximately 115° C. and a $M_w$ of approximately 1040 g/mol.
iv) Sylvarez® ZT 105 LT available from Arizona Chemicals which is a styrene/terpene copolymer having a softening point of approximately 105° C.

The tackifying resin(s) L having a softening temperature less than or equal to 50° C. represent from 5 to 35% of the adhesive composition, preferably from 10 to 35% of the adhesive composition.

According to an embodiment, the tackifying resin L has a softening temperature less than or equal to 30° C., preferably ranging from −10° C. to 30° C., more preferably from −5° C. to 20° C.

According to an embodiment of the invention, the tackifying resin L is chosen from:
i) rosins of natural origin or modified, such as for example the rosin extracted from pine gum, wood rosin extracted from tree roots and their derivatives, hydrogenated, dehydrogenated, dimerized, polymerized or esterified by monoalcohols or polyols such as glycerol;
ii) resins obtained by hydrogenation, polymerization or copolymerization (with an aromatic hydrocarbon) of mixtures of unsaturated aliphatic hydrocarbons having approximately 5, 9 or 10 carbon atoms, and originating from petroleum cuts;
iii) terpene resins resulting generally from the polymerization of terpene hydrocarbons such as for example mono-terpene (or pinene) in the presence of Friedel-Crafts catalysts, optionally modified by the action of phenols.

Among the tackifying resins L capable of use in the adhesive composition comprised in the laminate film according to the invention, there can be mentioned as examples of commercially available resin:
i) Sylvatac® RE12 available from Arizona Chemicals which is a rosin ester resin having a softening temperature of 12° C.
ii) Regalite® R1010 available from Eastman which is a hydrogenated hydrocarbon-containing resin having a softening temperature of 10° C.

The adhesive composition can also comprise from 0.1 to 2% of one or more stabilizers (or antioxidants). These compounds are introduced in order to protect the composition from degradation resulting from a reaction with oxygen which is likely to be caused by the action of heat, light or residual catalysts on certain raw materials such as the tackifying resins. These compounds can include primary antioxidants which trap the free radicals and which are generally substituted phenols such as Irganox® 1010 from CIBA. The primary antioxidants can be used alone or in combination with other antioxidants such as phosphites like Irgafos® 168 also from CIBA, or also with UV stabilizers such as amines.

The adhesive composition can also comprise a plasticizer, but in a quantity not exceeding 5%. It is possible to use as a plasticizer a paraffinic and naphthenic oil (such as Primol® 352 from ESSO) optionally comprising aromatic compounds (such as Nyflex 222B).

According to a preferred variant, the adhesive composition does not comprise a plasticizer.

According to another preferred variant, the adhesive composition comprises from 35 to 55% of the mixture of triblock and diblock copolymers, from 20 to 55% tackifying resin(s) S and from 10 to 35% tackifying resin(s) L.

According to an embodiment, the adhesive composition consists essentially of 35 to 55% of the mixture of triblock and diblock copolymers, 20 to 55% tackifying resin(s) S and 10 to 35% tackifying resin(s) L.

Finally, it is preferred to use in the multilayer (or laminate) film according to the invention an adhesive composition having a Brookfield viscosity measured at 190° C. greater than 5000 cP (5 Pa·s), preferably greater than 8000 cP (8 Pa·s).

The adhesive composition is prepared by simple mixture of the hot ingredients, between 150 and 200° C., by means for example of a blade mixer or a twin screw extruder.

The laminate film according to the invention comprises the adhesive composition as described previously in the form of a continuous layer having a thickness strictly less than 10 μm, preferably less than or equal to 9 μm, preferably less than or equal to 8 μm, preferably less than or equal to 7 μm, preferably less than or equal to 6 μm, and also more preferentially ranging from 1 to 5 μm.

According to an embodiment, the quantity of adhesive composition comprised in the multilayer film is strictly less than 10 $g/m^2$, preferably less than or equal to 9 $g/m^2$, preferably less than or equal to 8 $g/m^2$, preferably less than or equal to 7 $g/m^2$, preferably less than or equal to 6 $g/m^2$ and even more preferentially ranges from 0.5 to 5 $g/m^2$.

According to an embodiment, the layer of adhesive composition has a thickness ranging from 0.5 to 10 μm, preferably from 1 to 9 μm, preferably from 1 to 7 μm, more preferably from 2 to 5 μm.

The layer of adhesive composition makes it possible to ensure the cohesion between two thin layers of material the thickness of which can vary from 5 to 150 μm.

The cohesion of the multilayer film can be measured by a peel test at 180° C. as described in the French standard NF T 54-122. The cohesion of the multilayer film of the invention is preferably greater than or equal to 1 N/15 mm, preferably greater than or equal to 1.2 N/15 mm, more preferably greater than or equal to 1.8 N/15 mm.

The materials of which the thin layers surrounding the adhesive layer are constituted are generally chosen from the paper, aluminium or thermoplastic polymers such as: polyethylene (or PE), polypropylene (or PP), oriented or not, copolymers of ethylene and of vinyl acetate (or EVA), polyester, polyamide.

According to an embodiment, the materials of which the thin layers surrounding the adhesive layer are constituted are chosen from the heat-sealable materials.

Preferably, the material forming the multilayer film is not a silicone-coated material.

The laminate film according to the invention can comprise several layers of the aforementioned materials, and also several adhesives layers of the composition as previously defined. Its total thickness is capable of varying within a wide range from 20 to 400 μm.

According to a preferred embodiment, one of the 2 thin layers comprised in the multilayer film according to the invention is constituted over at least a portion of its surface by a transparent material and bears on at least a portion of the face which is in contact with the layer of adhesive composition an ink deposit, for example for the purposes of information relating to the wrapped product. This deposit of inks is carried out by a suitable printing process on the thin transparent layer, before it is laminated. It is advantageously protected from the outside by the thin transparent layer. The transparent material is for example polyester or polypropylene. The inks used are generally dispersions in a continuous phase, organic or mineral, of insoluble, organic or mineral pigments, very finely divided.

According to an embodiment, the multilayer film according to the invention comprises a thin layer based on a metallized material and a thin layer constituted by a transparent material over at least a portion of its surface area. Thus, thanks to the uniform and transparent appearance of the adhesive layer, the user is able to read for example printed information, without being inconvenienced by any visible defects by light reflection on the metallized portion of the thin layer.

As well as very good cohesion making it possible to prevent delamination of the films, the multilayer film according to the invention has an excellent visual appearance. Said film has over at least a portion of its surface area, a transparent and uniform visual appearance, making it possible in particular to view the food item or the object wrapped in the multilayer film.

The invention also relates to a process for the continuous preparation of the multilayer film according to the invention, comprising:
(i) a coating step by the adhesive composition as previously defined of a first thin layer of material, in which said composition, rendered pourable by heating to an appropriate temperature, is extruded by a coating device without contact with said thin layer, in the form of a substantially continuous layer, which is then placed in contact with the surface of said thin layer, then
(ii) a laminating step of a second thin layer, on the first thin layer coated according to step (i).

FIGS. 1 and 2, to which reference is made below, describe diagrammatically 2 embodiments of the lamination process according to the invention.

The thin layer 1 is presented in the form of a film which is packed by winding on a reel (not shown in the figure) the width of which corresponds to the standard width of said film and which is rotated by drive means (also not shown) so as to give said film a certain speed of movement in the direction indicated by the arrow, which may be up to 450 m/minute or even more.

The film (or thin layer) 1 is conveyed by the guide rolls 3 and/or 4 in the vicinity of the coating device 5 from which it remains separated by a distance comprised between 0.5 and 20 mm, preferably between 0.5 and 2 mm. The coating device is advantageously of the slot nozzle (also called "lip") type, the slot of which is rectangular in shape with the long side (or width) corresponding to the standard width of the film 1 to be coated (which may range up to approximately 2 m), and the short side of which (or height) can measure from 100 to 1000 μm.

The temperature at which the adhesive composition is rendered pourable can vary from 140 to 210° C., and is obtained by means of heating said composition placed according to circumstances in a melting tank or extruder.

The substantially continuous layer 6 of adhesive composition has a thickness at the outlet of the nozzle slot that corresponds substantially to the height of the slot, i.e. a thickness that can vary from 100 to 1000 μm. Under continuous operation, said layer is moved suspended in the air over the distance between its placing in contact with the film 1 to be coated and the coating device 5.

Under continuous operation the substantially continuous layer of adhesive composition 6 is stretched under the effect of the force resulting from the movement of the film, so that its thickness, comprised between 100 and 1000 μm on leaving the nozzle, is brought to a thickness less than 10 μm in the vicinity of its contact with the film 1, or less than or equal to 7 μm, or even less than or equal to 5 μm. This difference in thickness is not shown in FIGS. 1 and 2.

According to a first embodiment, shown in FIG. 1, of the coating step (i) of the process according to the invention, the substantially continuous layer 6 of adhesive composition extruded by the coating device 5:
(a) passes through the space between said device and the film (1), suspended in the air, the pressure of which is reduced locally to a value comprised between 500 and 975 mbars, preferably between 750 and 900 mbars, then
(b) is placed in contact with the film (1) in the vicinity of the edge (10c) formed by the 2 guide surfaces (10a) and (10b) of a deflection element (10) through which a compressed air line (not shown in the figure) opening out via at least one outlet opening into the area of the edge 10c, such that the discharged compressed air forms an air cushion around said edge. The air cushion advantageously reduces the friction between the edge 10c and the film 1 during the movement at high speed of the latter.

Lowering the atmospheric pressure in the vicinity of the layer 6 suspended in the air is advantageously obtained by a vacuum box 11 having suitable geometry, which is connected to a vacuum source (not shown in FIG. 1).

The 2 guide surfaces 10a and 10b of the deflection element 10 are adapted to the guidance of the film 1 and to the modification of its direction of transport, as indicated in FIG. 1. The film 1 passes along the inward guidance surface 10a of the deflection element 10, its direction of transport being radically modified by the edge 10c, and then passes along the outward guidance surface 10b, in the direction of the arrow. An air cushion is present between the film 1 and the deflection element 10, the 2 surfaces 10a and 10b being configured as air-cushioned surfaces.

The combination of lowering the atmospheric pressure and the deflection element 10 is particularly advantageous, because it avoids the inclusion of air between the layer 6 of adhesive composition and the film 1, inclusion which can become particularly troublesome for high movement speeds of the film, in particular greater than 450 m/minute.

For the description of said deflection element 10, reference is made to international application WO 2005/099911.

According to a second embodiment of coating step (i) of the process according to the invention, illustrated by FIG. 2, the substantially continuous layer 6 of adhesive composition extruded by the coating device 5, after it has been placed in contact with the film 1, is pressed onto the latter by a roll (7) the outer surface of which is provided with a non-stick coating, for example based on polytetrafluoroethylene. Said roll 7, with roll 4, exerts pressure on the adhesive layer deposited on the film 1, and thus avoids trapping air between said film and the adhesive layer for high movement speeds of the film, in particular greater than 100 m/minute, or even 450 m/minute.

For the description of this second embodiment, reference is specifically made to the aforementioned application WO 99/28048.

Coating step (i) comprised in the process according to the invention is followed by a step (ii) of laminating a second thin layer 2 of material on the first thin layer 1 covered by the substantially continuous layer of adhesive composition 6. This second thin layer 2 is also presented in the form of a film which is also advantageously packaged like the first in reel form; it is composed of a material identical to or different from that used for the first thin layer 1. The lamination is carried out by application of a pressure exerted by the rolls 8 and 9.

Thus advantageously 2 thin layers of material bonded by a layer of adhesive composition are obtained, the whole being comprised in the laminate film according to the invention, as defined previously. This laminate film is also packaged on a reel.

The laminate films according to the invention are capable of use for the manufacture of the most varied flexible wrappings, which are shaped then closed (after the step of packaging the product intended for the consumer) by the technique of heat sealing (or heat welding).

According to an embodiment, the flexible wrapping obtained using the multilayer film according to the invention has a transparent window allowing the food item or the wrapped object to be viewed.

Peel Test at 180°:

The cohesion of the composite film according to the invention is tested by the peel test at 180° as described French standard NF T 54-122. The principle of this test consists of determining the force necessary for the separation (or peeling) of 2 individual layers of films bonded by the adhesive.

A rectangular-shaped test piece of 1.5 cm wide and approximately 10 cm long is cut from the laminate film. From the end of this test piece, and over approximately 2 cm, the 2 individual layers of film comprised in this strip and the 2 free ends obtained are fixed onto two attachment devices linked, respectively, to a fixed portion and a mobile portion of a traction device that are situated on a vertical axis.

When a drive mechanism gives the mobile portion a uniform speed of 100 mm/minute, leading to the detachment of the 2 layers the ends of which move progressively along a vertical axis, forming an angle of 180°, the fixed portion, connected to a dynamometer, measures the force which the test piece thus held is able to withstand.

The result is expressed in N/15 mm.

Visual Test

The visual appearance is assessed by one or more skilled persons. In general terms, the eye in fact allows defects (or bubbles, spots, etc) of a size greater than or equal to 40 µm to be detected. The observation is carried out under natural light. The sample is assessed over its entire width (more than a meter in industrial use) and at different moments (yardage) of the production. The appearance is scored by referring to a colour chart.

The score from 1 to 5 indicated in Table 1 below is described as follows:
1: Poor—Non-uniform,
2: Poor—Uniform (slightly cloudy (haze), orange peel, etc),
3: Acceptable (average):
4: Good—Standard quality obtained in the trade,
5: Equivalent to that obtained with a polyurethane-based solvent adhesive or in the absence of adhesive.

The score is an integer value, with an assessment that is as close as possible to the reference (colour chart).

The visual aspect is assessed during production, and after 3 days' storage at 23° C. +/−2° C. It is the value at 3 days which is recorded within the framework of the invention.

The visual appearance of the multilayer film according to the invention is preferably greater than or equal to 3.

The following examples are given purely by way of illustration of the invention and can in no way be interpreted as limiting its scope.

EXAMPLE 1

The adhesive composition given in Table 1 is prepared by simple hot mixing of the ingredients at 170° C.

For this adhesive composition a Brookfield viscosity at 190° C. of 14000 mPa·s and a softening temperature of 117° C. are measured.

This adhesive composition is used for the manufacture of a composite film comprising 2 layers each constituted by an oriented polypropylene film of thickness 20 µm and bonded together by a layer of said composition of thickness comprised between 3 and 5 µm according to the tests.

In order to produce this film a laminating machine is used the structure of which corresponds diagrammatically to the device shown in FIG. 1. The 2 films of oriented polypropylene are packaged on a reel of 40 cm standard width. The polypropylene reel to be coated is driven by a motor allowing a speed of movement to be given to the substrate ranging up to 600 m/minute. The coating device 5 comprises a lip nozzle marketed by NORDSON under reference BC 70, the slot of which has the shape of a rectangle with length 30 cm and height 600 µm. This nozzle is placed at 1 mm from the thin-layer substrate to be coated.

The guide surfaces 10a and 10b of the deflection element 10 form an angle of approximately 60°. The pressure created in the vicinity of the continuous film of adhesive composition 6 between the coating device 5 and the film 1 is kept between 750 and 900 mbar by means of the vacuum box 11.

The adhesive composition is extruded by the lip nozzle at the extrusion temperature given in Table 1 and at a pressure comprised between 70 and 90 bars. The lamination of the film 2 onto the film 1 thus coated is carried out by means of the rolls 8 and 9.

The polypropylene film to be coated is given a speed of movement of 100 m/minute. At the output of the nozzle, after establishing steady state, a continuous and cohesive adhesive film 6 is obtained, ensuring the production of the bi-layer film.

The movement speed is then increase to a value of 300 m/minute, then to a value of 500 m/minute, obtaining the same result as for the movement speed of 100 m/minute.

The maximum movement speed of the film is 500 m/minute, corresponding to the maximum speed at which a continuous and cohesive film 6 of adhesive composition is obtained at the outlet of the nozzle. This film 6 leads to depositing on the film 1a layer of thickness comprised between 3 and 5 μm, corresponding to a grammage approximately comprised between 3 and 5 g/m².

The visual test gives a visual appearance after 3 days of 3.

EXAMPLES 2 to 8

The same experimental protocol is applied with each of the different adhesive compositions the contents of which in constituents are given in Table 1.

The results of the peel test and of the visual test are also given in Table 1.

TABLE 1

| | Content in % | | | | | | | |
|---|---|---|---|---|---|---|---|---|
| Composition | 1 | 2 | 3 | 4 | 5 | 6 | 7 | 8 |
| Kraton ® D1113BT | 39.80 | 39.80 | 39.80 | 39.80 | 39.80 | 39.80 | 39.80 | |
| Vector ® 4111 | | | | | | | | 39.80 |
| Dercolyte ® S115 | | | | | 22.39 | | | |
| Escorez ® 5400 | 49.75 | 34.83 | 24.88 | | | 59.70 | 14.93 | |
| Escorez ® 5615 | | | | | | | | 13.93 |
| Escorez ® 1310 LC | | | | | 37.31 | | | |
| Escorez ® 2203 LC | | | | 49.75 | | | | |
| Regalite ® R1010 | 9.95 | 24.88 | 34.83 | | | | 44.78 | |
| Sylvatac ® RE12 | | | | 9.95 | | | | 45.77 |
| Irganox ® 1010 | 0.50 | 0.50 | 0.50 | 0.50 | 0.50 | 0.50 | 0.50 | 0.50 |
| Viscosity at 190° C. (mPa · s) | 14000 | 11000 | 9000 | 11500 | 30000 | 13000 | 7000 | 15000 |
| Softening temperature (° C.) | 117 | 113 | 113 | 113 | 140 | 115 | 111 | 70 |
| Extrusion temperature (° C.) | 190 | 170 | 170 | 160 | 195 | 185 | 170 | 165 |
| Peel test at 23° C. (N/15 mm) | 2.0 | 1.2 | 1.1 | 2.2 | 2.8 | 2.2 | 0.9 | 0.9 |
| Visual test | 3 | 3 | 5 | 3 | 2 | 2 | 5 | 5 |

Vector® 4111 is an SIS copolymer of linear structure having a diblock content of 0% and a styrene content of 19%.

Compositions 1 to 4 correspond to multilayer films according to the invention. In fact, the tests above show, for these compositions, a result in the peel test greater than or equal to 1 N/15 mm and a result in the visual test greater than or equal to 3.

Compositions 5 and 6, although they show good results in the peel test (respectively 2.2 and 2.8 N/15 mm), they do not have satisfactory results in the visual test (less than 3).

Compositions 7 and 8, although they show good results in the visual test (a result of 5), they do not have satisfactory results in the peel test (less than 1 N/15 mm).

Compositions 5 to 8 are comparative examples and do not form part of the present invention.

The invention claimed is:

1. A multilayer film comprising at least 2 thin layers of material having a thickness of 5 to 150 μm bonded together by a layer having a thickness 3-5 μm of an adhesive composition comprising:
   a) from 30 to 60% of a mixture of styrene block copolymers comprising at least one elastomer block, comprising:
      5 to 75% of at least one triblock copolymer that is SIS, SIBS, SBS, SEBS or SEPS, and from
      25 to 95% of at least one diblock copolymer that is SI, SBI, SIB, SB, SEB, or SEP, the overall content of styrene units of said mixture being comprised between 10 and 40%;
   b) from 10 to 60% of one or more tackifying resins S having a softening temperature greater than or equal to 80° C.; and
   c) from 5 to 35% of one or more tackifying resins L having a softening temperature less than or equal to 50° C., by weight with respect to the total weight of the adhesive composition,
wherein the material(s) forming the multilayer film is(are) not a silicone-coated material; and
wherein the said multilayer film is transparent, suitable for flexible wrapping, and has a cohesive force greater than or equal to 1 N/15mm, and wherein the quantity of adhesive composition is approximately 3-5 g/m².

2. The multilayer film of claim 1, wherein the triblock and diblock copolymers present in the mixture of styrene block copolymers have the same elastomer block.

3. The multilayer film of claim 1, wherein the triblock copolymers comprised in the adhesive composition have a linear structure.

4. The multilayer film of claim 1, wherein the mixture of styrene block copolymers, at least one triblock copolymer SIS having a linear structure is used, in a mixture with at least one diblock copolymer SI.

5. The multilayer film of claim 1, wherein the tackifying resin(s) S has (have) a softening temperature greater than or equal to 90° C.

6. The multilayer film of claim 1, wherein the tackifying resin(s) L has (have) a softening temperature less than or equal to 30° C.

7. The multilayer film of claim 1, wherein the tackifying resin(s) S, having a softening temperature greater than or equal to 80° C., is:
  i) rosins of natural origin or modified;
  ii) resins obtained by hydrogenation, polymerization or copolymerization (with an aromatic hydrocarbon) from mixtures of unsaturated aliphatic hydrocarbons having approximately 5, 9 or 10 carbon atoms, and originating from petroleum cuts;
  iii) terpene resins resulting from the polymerization of terpene hydrocarbons in the presence of Friedel-Crafts catalysts, optionally modified by the action of phenols; or
  iv) copolymers based on natural terpenes.

8. The multilayer film of claim 7, wherein the tackifying resin S, having a softening temperature greater than or equal to 80° C., belongs to categories ii) and iii).

9. The multilayer film of claim 1, wherein the tackifying resin L, having a softening temperature less than or equal to 50° C., is selected from:
  i) rosins of natural origin or modified;
  ii) resins obtained by hydrogenation, polymerization or copolymerization (with an aromatic hydrocarbon) from mixtures of unsaturated aliphatic hydrocarbons having approximately 5, 9 or 10 carbon atoms, and originating from petroleum cuts;
  iii) terpene resins resulting from the polymerization of terpene hydrocarbons.

10. The multilayer film of claim 1, wherein the adhesive composition comprises:
  a) from 35 to 55% of the mixture of styrene block copolymers,
  b) from 20 to 55% of tackifying resin(s) S and
  c) from 10 to 35% of tackifying resin(s) L
  by weight with respect to the total weight of the adhesive composition.

11. The multilayer film according to claim 1, in which the thin layers bonded together by the adhesive composition are made from thermoplastic polymers.

12. The multilayer film of claim 1, wherein one of the 2 thin layers bears a deposit of inks on at least a portion of the face which is in contact with the layer of adhesive composition.

13. A method for the continuous preparation of the multilayer film as defined in claim 1, comprising:
  i) coating by the adhesive composition of a first thin layer of material, in which said composition, rendered pourable by heating to an appropriate temperature, is extruded by a coating device without contact with said thin layer, in the form of a substantially continuous layer, which is then placed in contact with the surface of said thin layer, then
  ii) laminating of a second thin layer, on the first thin layer coated according to step i).

14. The method according to claim 13, in which in the coating i), the substantially continuous layer (6) of adhesive composition extruded by the coating device (5):
  a) passes across the space between said device and the film (1), in suspension in air, the pressure of which is reduced locally to a value comprised between 500 and 975 mbars, then
  b) is placed in contact with the film (1) in the vicinity of the edge (10c) formed by the 2 guide surfaces (10a) and (10b) of a deflection element (10) through which a compressed air line passes, opening out via at least one outlet opening in the area of the edge (10c), such that the discharged compressed air forms an air cushion around said edge.

15. A method according to claim 13, in which, in coating i), the substantially continuous layer (6) of adhesive composition extruded by the coating device (5), after it has been placed in contact with the film (1), is pressed onto the latter by a roll (7) the outer surface of which is provided with a non-stick coating.

16. A method of manufacturing flexible wrapping comprising using the multilayer film of claim 1 as wrapping.

* * * * *